United States Patent
Elovici et al.

(10) Patent No.: US 9,934,388 B2
(45) Date of Patent: *Apr. 3, 2018

(54) METHOD AND SYSTEM FOR DATABASE ENCRYPTION

(71) Applicant: BEN-GURION UNIVERSITY OF THE NEGEV, RESEARCH AND DEVELOPMENT AUTHORITY, Beer Sheva (IL)

(72) Inventors: Yuval Elovici, Arugot (IL); Ronen Vaisenberg, Beer Sheva (IL); Erez Shmueli, Beer Sheva (IL)

(73) Assignee: Ben-Gurion University of the Negev Research and Development Authority, Beer Sheva (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/622,961

(22) Filed: Feb. 16, 2015

(65) Prior Publication Data
US 2015/0178506 A1 Jun. 25, 2015

Related U.S. Application Data

(63) Continuation-in-part of application No. 14/108,783, filed on Dec. 17, 2013, now abandoned, which is a
(Continued)

(51) Int. Cl.
*G06F 21/00* (2013.01)
*G06F 21/60* (2013.01)
(Continued)

(52) U.S. Cl.
CPC ........ *G06F 21/602* (2013.01); *G06F 21/6227* (2013.01); *H04L 9/002* (2013.01);
(Continued)

(58) Field of Classification Search
CPC .... G06F 21/602; G06F 21/6227; G06F 17/30; H04L 9/008; H04L 63/0435; H04L 9/0618; H04L 9/0894; H04L 9/002
(Continued)

(56) References Cited

U.S. PATENT DOCUMENTS 5,175,766 A * 12/1992 Hamilton ............ G06F 21/6245
705/64
5,657,390 A * 8/1997 Elgamal ................. H04L 29/06
713/151
(Continued)

OTHER PUBLICATIONS

Balancing Confidentiality and Efficiency in Untrusted Relational DBMSs|http://dl.acm.org/citation.cfm?id=948124|2003|Pages 93-102|Damiani et al.*

*Primary Examiner* — Mahfuzur Rahman
(74) *Attorney, Agent, or Firm* — Roach Brown McCarthy & Gruber, P.C.; Kevin D. McCarthy

(57) ABSTRACT

A method for encrypting a database, according to which a dedicated encryption module is placed inside a Database Management Software above a database cache. Each value of the database is encrypted together with the coordinates of said value using a dedicated encryption method, which assumes the existence of an internal cell identifier that can be queried but not tampered.

6 Claims, 13 Drawing Sheets

Related U.S. Application Data continuation of application No. 11/628,284, filed as application No. PCT/IL2005/000556 on May 30, 2005, now Pat. No. 8,639,947.

(60) Provisional application No. 60/575,379, filed on Jun. 1, 2004.

(51) Int. Cl.

| | | |
|---|---|---|
| *G06F 21/62* | (2013.01) | |
| *H04L 9/00* | (2006.01) | |
| *H04L 9/06* | (2006.01) | |
| *H04L 9/08* | (2006.01) | |
| *H04L 29/06* | (2006.01) | |
| *G06F 17/30* | (2006.01) | |

(52) U.S. Cl.
CPC ............ *H04L 9/008* (2013.01); *H04L 9/0618* (2013.01); *H04L 9/0894* (2013.01); *H04L 63/0435* (2013.01); *G06F 17/30* (2013.01)

(58) Field of Classification Search
USPC ........................................................ 713/193
See application file for complete search history.

(56) References Cited

U.S. PATENT DOCUMENTS

| | | | | |
|---|---|---|---|---|
| 5,781,628 A | * | 7/1998 | Alperovich | H04L 63/0428 |
| | | | | 380/258 |
| 5,924,094 A | * | 7/1999 | Sutter | G06F 17/30575 |
| 6,249,866 B1 | * | 6/2001 | Brundrett | G06F 12/1408 |
| | | | | 380/286 |
| 6,446,092 B1 | * | 9/2002 | Sutter | G06F 17/30578 |
| 7,143,288 B2 | * | 11/2006 | Pham | H04L 63/101 |
| | | | | 713/165 |

\* cited by examiner

A table before Encryption

Encryption of the Table

300 → 301 302    311 312 310

| Row | C |
|-----|-----|
| 0 | 16 |
| 1 | 85 |
| 2 | 37 |
| 3 | 16 |
| 4 | 16 |
| 5 | 92 |
| 6 | 37 |
| 7 | 50 |
| 8 | 24 |
| 9 | 86 |

303, 304, 305

| Row | CC |
|-----|-----|
| 0 | #$ |
| 1 | ]} |
| 2 | &* |
| 3 | #$ |
| 4 | #$ |
| 5 | ^% |
| 6 | &* |
| 7 | 0- |
| 8 | += |
| 9 | @! |

|  |  | Operating System | Storage Engine | Above Cache |
|---|---|---|---|---|
| DBMS |  | MySQL | MySQL | MySQL |
| Encryption | Algorithm | AES | AES | AES |
|  | Key length | 128 | 128 | 128 |
|  | Mode | CBC | CBC | CBC |
|  | Key initialization | Page | Cell | Cell |
|  | Padding | None | Value | Value |
|  | $\mu$ | None | None | $SHA-1(t\|\|r\|\|c)$ |

Fig. 5 a) Table T before encryption

| rowid | C |
|---|---|
| 0 | 10 |
| 1 | 8 |
| 2 | 5 |
| 3 | 7 |
| 4 | 12 |

Fig. 6a b) Encryption of Table T

| rowid | $C: E_k(\mu(T,R,C) \oplus V_{trc})$ |
|---|---|
| 0 | $C: E_k(\mu(T,0,C) \oplus 10)$ |
| 1 | $C: E_k(\mu(T,1,C) \oplus 8)$ |
| 2 | $C: E_k(\mu(T,2,C) \oplus 5)$ |
| 3 | $C: E_k(\mu(T,3,C) \oplus 7)$ |
| 4 | $C: E_k(\mu(T,4,C) \oplus 12)$ |

Fig. 6b

```
//Reading a value from cache
UNIV_INLINE byte* rec_get_nth_field(
    rec_t*          rec,
    const ulint*    offsets,
    ulint           n,
    ulint*          len
){
    ...

#ifdef ABOVE_CACHE_ENCRYPTION
        //encrypt the value
    #endif /* ABOVE_CACHE_ENCRYPTION */

...
}

//Writing a value to cache
UNIV_INLINE void rec_set_nth_field(
    rec_t*          rec,
    const ulint*    offsets,
    ulint           n,
    const void*     data,
    ulint           len
){
    ...

#ifdef ABOVE_CACHE_ENCRYPTION
        //decrypt the value
    #endif /* ABOVE_CACHE_ENCRYPTION */

METHOD AND SYSTEM FOR DATABASE ENCRYPTION

FIELD OF THE INVENTION

The present invention relates to a method and system for database encryption. More particularly, the invention relates to database encryption method and system, wherein, the architecture is based on placing the encryption module inside the database management software (DBMS), just above the database cache and using a dedicated technique to encrypt each database value together with its coordinates.

BACKGROUND OF THE INVENTION

Database is an integral part of almost every information system. The key features databases propose are shared access, minimal redundancy, data consistency, data integrity and controlled access. The case where databases hold critical and sensitive information is quite common, therefore an adequate level of protection to database content has to be provided.

Businesses and organizations must continually evolve and learn to manage information correctly, in order to realize their objectives and survive in the digital era. Indeed, the very survival of these organizations may depend on securing this information.

To illustrate the scope of the problem, it can be assumed a client-server scenario where the client has a combination of sensitive and non-sensitive data stored in a database at the server side. In such a scenario there are three major vulnerabilities with respect to client data: (1) Data-in-motion: assuming that the client and server are not co-located, it is vital to secure the communications between them, a solution to this can be accomplished via a standard SSL or VPN connection; (2) Data-in-use: an adversary can directly access the memory of the database server and extract sensitive information and (3) Data-at-rest: refers to all data in the database server while excluding data that is traversing a network or temporarily residing in the server's memory.

Typically, database management systems (DBMSs) protect stored data through access control mechanisms. However, an access control mechanism by itself is insufficient to protect stored data since it can be bypassed in a number of ways: by accessing database files following a path other than through the DBMS (e.g., an intruder who infiltrates the information system and tries to mine the database footprint on disk); by physical removal of the storage media; or by accessing the database backup files.

Another source of threats comes from the fact that many databases are today outsourced to Database Service Providers (DSP). In such instances, data owners have no other choice than to trust DSP's who claim that their systems are fully secured and their employees are beyond any suspicion, assertions frequently repudiated by facts. Finally, a database administrator (DBA) may have sufficient privileges to tamper with the access control definition.

An old and important principle called defense in depth involves multiple layers of security control such that attackers must get through layer after layer of defense. In this context, encryption, which can complement and reinforce access control, has recently received much attention from the database community. The purpose of database encryption is to ensure database opacity by keeping the information hidden to any unauthorized person (e.g., intruder).

Even if attackers get through the firewall and bypass access control mechanisms, they still need the encryption keys to decrypt data. Encryption can provide strong security for data at rest, but developing a database encryption solution must take many factors into consideration.

Database encryption schemes should fulfill the following requirements, including the necessity for protecting data confidentiality, detecting unauthorized modifications and maintaining high performance.

The Attacker Model

Attackers can be categorized into three classes: intruders, insiders and administrators. Intruder is a person who gains access to a computer system and tries to extract valuable information. Insider is a person who belongs to the group of trusted users and tries to get information that he is unauthorized to access. Administrator is a person who has privileges in administering a computer system, but abuses his rights in order to extract valuable information. In many cases, a DBA has access to the whole database and protecting it against him while simultaneously enabling him to perform his tasks becomes a tremendous challenge.

All of the above attackers may use different attack strategies: Direct Storage Attacks are attacks against storage, which may be carried out by accessing database files by means other than the database software, such as by physically removing the storage media or by accessing the database backup files.

In Indirect Storage Attacks, the adversary can access schema information and metadata, such as table and column names, column statistics and values written to recovery logs, in order to estimate data distributions. In Memory Attacks, the adversary may access the memory of the database software directly. In many cases, the memory contains the database cache which holds large amounts of the database for optimization reasons.

A secure database should not reveal any information about the database plaintext values to unauthorized users. This requirement can be extended and the different types of passive attacks can be categorized as follows: (a) Static Leakage—gaining information about the database plaintext values by observing a snapshot of the database at a certain time. For example, if the values in a table are encrypted in such a way that equal plaintext values are encrypted to equal cipher-text values, statistics about the plaintext values, such as their frequencies, can easily be collected from the encrypted values. (b) Linkage Leakage—gaining information about the database plaintext values by linking a database value to its position in the index. For example, if the database value and the index value are encrypted the same way (both ciphertext values are equal), an observer can search the database ciphertext value in the index, determine its position and estimate its plaintext value; and (c) Dynamic Leakage—gaining information about the database plaintext values by observing and analyzing access patterns and changes in the database over a period of time. For example, if a user monitors the index for a period of time and, if in this period of time only one value is inserted (no values are updated or deleted), the observer can estimate its plaintext value based on its new position in the index.

In addition to the passive attacks in which data is compromised as a result of observations, there are also different types of active attacks, which modify the database, as follows: (a) Spoofing—replacing a ciphertext value with a generated value. Assuming that the encryption keys were not compromised, this attack is rarely practical. (b) Splicing—replacing a ciphertext value with a different ciphertext value. In this type of attack, the encrypted content from a different location is copied to a new location. For example, if the maximal salary value encrypted is revealed through a leakage attack, swapping it with the attacker's encrypted salary will generate a valid value as his new salary; and (c) Replay—replacing a ciphertext value with an old version previously updated or deleted.

An important aspect of data security relates to the support of multi-user access control of an encrypted database environment where each user can only access (decrypt) the database objects (e.g., groups of cells, rows and columns) to which access was granted. Hereinafter this property is referred to as Cryptographic Access Control. Encrypting the entire database using the same key, even if traditional access control mechanisms are used, will not introduce a sufficient level of security. Encrypting objects from different security groups using various keys ensures that a user who owns a specific key can decrypt only those objects within his security group. Another important issue which relates to the encryption keys is their management: where and how the encryption keys should be stored; how are they being distributed to the users; and how to recover the encryption keys in case they are lost.

Performance

Security mechanisms typically introduce significant computational overhead. This overhead may constitute a fundamental problem for the DBMS, since the performance of the DBMS has a direct influence on the performance of the whole information system. When trying to minimize the performance overhead that results from encrypting the database, the following issues should be considered: (a) Selective encryption—it would be desirable to encrypt only sensitive data while keeping insensitive data unencrypted. Furthermore, only relevant data should be encrypted/decrypted when executing a query. For example, if only one attribute participates in a query, it would be unnecessary to encrypt/decrypt the entire record.

(b) Indexes and other DBMS optimization mechanisms—encrypting the database content may prevent some crucial DBMS optimization mechanisms from functioning properly. For example, some DBMS vendors do not permit building indexes on encrypted columns, while others allow it based on the column's encrypted values (in case they are not salted, (salted in cryptography means that a random value is concatenated to the plaintext value before encryption)). The latter approach results in a loss of some of the most obvious characteristics of indexes, the range searches, since a typical encryption algorithm is not order-preserving.

(c) Encryption overhead—it is desirable that the time spent for encrypting/decrypting data is minimized. For example, encrypting the same amount of data using a single encryption operation is more efficient than encrypting it in parts using several encryption operations as described in B. Iyer, S. Mehrotra, E. Mykletun, G. Tsudik, Y. Wu, A framework for efficient storage security in rdbms, Advances in Database Technology—EDBT 2004 (2004) 627-628.

Incorporating an encryption solution over an existing DBMS should be easy to integrate, namely, it is desirable to minimize the following:

(a) The influence on the application layer—some encryption solutions require modifying the implementation of the application layer, for example, by changing the SQL queries to include encryption operations. Such modifications may constitute a fundamental problem for legacy applications, wherein most cases, the process of making changes to their implementation is extremely costly, and in some cases, might not be possible at all. Therefore, a practical database encryption solution should not require a major modification to the implementation of the application layer.

(b) The influence on the DBMS architecture—it is desirable to avoid fundamental changes to the DBMS implementation. Database technology has been around for more than 30 years. Redesigning the relational model to support a new encryption model is unacceptable. It is fundamental in respect to the practicality of a DBMS encryption solution that it will be built on top of an existing DBMS implementation, including all of its functionality, such as indexing, foreign key mechanisms and locking schemes.

(c) The influence on the DBA—it is desirable to allow the DBA to perform his administrative tasks directly over the encrypted data, without the need to decrypt it first (and as a consequence, prevent sensitive data from being disclosed to the DBA).

(d) The storage overhead—Although storage nowadays is relatively cheap, it is preferable that the encrypted database should not require much more storage than the original non-encrypted database.

The encryption operation according to prior art can take place at different layers, as illustrated in FIG. 1a. Several architectures for the encryption of databases are known in the art. In the Operating System layer 102, pages are encrypted/decrypted by the operating system when they are written/read from disk 101. This layer has the advantage of being totally transparent, thus avoiding any changes to the DBMS and to existing applications. Furthermore, encryption in this layer is relatively resistant to information leakage and unauthorized modifications as a large number of database objects are encrypted in one chunk. However, it suffers from several fundamental problems: (1) Since the operating system has no knowledge of database objects and their internal structure, it is impossible to encrypt different parts of the page using different encryption keys (e.g., when those parts belong to users with different authorizations) and thus cryptographic access control cannot be supported. (2) It is not possible to encrypt specific portions of the database and leave others in their plaintext form. Furthermore, not only relevant data is decrypted during a query execution since each access requires the decryption of an entire page. Therefore, selective encryption is very limited. (3) The DBA cannot perform any administrative task (e.g., dropping a column) without possessing the encryption keys. (4) The database cache, which usually contains a large amount of disk page copies for improving performance, is kept in its plaintext form, and is thus vulnerable to data-in-use attacks.

The next possible encryption layer is the Storage Engine 103. Similarly to the operating system layer 102, pages in this layer are encrypted/decrypted when they are written/read from disk 101. However, as opposed to the operating system layer 102, encryption/decryption operations are performed by the DBMS 110, at the cell-level granularity. In other words, each time a page is loaded from disk, all encrypted values in that page are decrypted (each one separately), and each time a page is stored to disk, all sensitive values in that page are encrypted (again, each one separately). However, although the use of cell-level encryption granularity allows different values within a page to be encrypted using different keys, when a page is read from the disk into the database cache, the whole page must be decrypted, even if the initiating user does not have authorization to access all values in that page. Moreover, the fact that each time a page is written/read from disk 101, multiple encryption/decryption operations are performed, may degrade performance substantially, compared to the single encryption/decryption operation per page in the operating system layer. Note that encryption in this layer 103, is located beneath the query execution engine 105 and is therefore transparent to the query execution engine 105 and all layers above it (including the application).

SQL Interface layer 106, is a layer where data is encrypted using predefined stored procedures, views and triggers. While encryption in this layer 106, is easy to implement and does not usually require significant changes to the application layer, it has the following limitations: (1) encryption takes place above the query execution engine, and thus some database mechanisms (e.g., indexes and foreign keys) may not function properly; (2) the use of stored procedures entails a context switch from SQL to the stored procedure language which usually has a high negative impact on performance; (3) those mechanisms (namely: triggers, views and stored procedures) can be disabled by a malicious DBA.

The next layer, is the application layer 107. In this layer, sensitive data is encrypted in the application layer 107, before it is sent to the database and decrypted before usage. It supports the highest degree of freedom in terms of enforcing cryptographic access control. However, it suffers from the following disadvantages: (1) modifying legacy applications may require a lot of resources i.e., time and money; (2) as encryption takes place above the query execution engine, different database mechanisms cannot function properly and need to be re-implemented by the application; (3) it re-invents the wheel for each new application that is being developed.

The next layer is the client layer 108, which may promise the highest degree of security since the only one that is able to access the sensitive data is the legitimate client. However, it implies limiting the ability of the database server to process the encrypted data and in extreme cases, to use the database server for storage only.

When implementing a database encryption solution, one needs to decide on the combination of: (1) trust in the database server; (2) encryption granularity; and (3) layer of encryption.

However, choosing the layer of encryption dictates the trust in the database server and the encryption granularity. The client and application layers dictate a full-mistrust in the database server, while the SQL interface, storage engine and operating system layers are implemented at the server side, and thus consider the database server to be partially trusted. The operating system layer 102 is the only layer that is unaware of the database objects' internal structure and thus requires a page level encryption granularity, while all other layers dictate a cell level encryption granularity.

Existing commercial products for database encryption commonly implement encryption at the SQL interface layer (e.g., SafeNet ProtectDB), the storage engine layer (e.g., Oracle TDE), or the operating system layer (e.g., SQL Server TDE).

The client layer 108 and the application layer 107 architectures, while providing the highest level of security, are impractical in most cases due to their high impact on performance and to the changes that they impose on the application layer.

FIG. 5 is a schematic table, which summarizes the properties of the different architectures.

It is therefore an object of the present invention to provide a system and method for database encryption, which should not require a major modification to the implementation of the application layer.

It is another object of the present invention to provide a system and method for database encryption, which is built on top of an existing DBMS implementation, including all of its functionality, such as indexing, foreign key mechanisms and locking schemes.

It is yet another object of the present invention to provide a system and method for database encryption, which allows the DBA to perform his administrative tasks directly over the encrypted data, without the need to decrypt it first.

It is yet another object of the present invention to provide a system and method for database encryption, which should not require much more storage than the original non-encrypted database.

Further purposes and advantages of this invention will appear as the description proceeds.

SUMMARY OF THE INVENTION

The Invention is directed to a method for encrypting a database, comprising the steps of:
(a) placing a dedicated encryption module inside a Database Management Software above a database cache; and
(b) encrypting each value of said database together with the coordinates of said value using a dedicated encryption method.

In an embodiment of the invention, the dedicated encryption method assumes the existence of an internal cell identifier that can be queried but not tampered, and wherein said encryption method is implemented according to:

$$E_{nc\_k}(V_{trc}) = E_k(\mu(t,r,c) \oplus V_{trc});$$

wherein $V_{trc}$—is a plaintext value located in a table t, row r and column c; $\mu$: (N×N×N)→N is a function generating a unique number based on said cell coordinates;

k is an encryption key;

$E_k$ is a symmetric encryption function; and $E_{nc\_k}$ is a function which encrypts a plaintext value with said coordinates of said value.

In an embodiment of the invention, $V_{trc}$ is decrypted by a decryption method, which is symmetric to the encryption method and is defined according to;

$$D_{ec\_k}(X_{trc}) = \mu(t,r,c) \oplus D_k(X_{trc}) = V_{trc};$$

wherein $X_{trc} = E_{nc\_k}(V_{trc})$;

$D_k(X_{trc})$ is a symmetric decryption function that suits $E_k$; and $D_{ec\_k}$ is a function which decrypts a ciphertext value ($X_{trc}$).

In an embodiment of the invention, whenever the range of valid plaintext values is not significantly smaller than the whole possible range, or invalid plaintext values cannot be distinguished from valid plaintext values, said encryption method is implemented according to;

$$E_{nc\_k}(V_{trc}) = E_k(\mu(t,r,c) \| V_{trc});$$

wherein $\|$ stands for concatenation.

In an embodiment of the invention, the coordinates of a value are a table, row and column.

In an embodiment of the invention, the indexes of the database are constructed on encrypted columns in the exact same way that said indexes were constructed on non-encrypted columns.

In an embodiment of the invention, the database backup operations at the database file granularity level are performed without the need to encrypt or decrypt data.

BRIEF DESCRIPTION OF THE DRAWINGS

In the drawings;

FIG. 3 illustrates a database encryption method, according to the prior art;

FIG. 5 is a schematic table, which summarizes the properties of the different architectures;

FIGS. 6a-6b schematically illustrate the table encryption in the scheme of the present invention according to an embodiment of the invention;

FIG. 7 schematically shows the implementation of the present invention according to an embodiment of the invention;

Figure 1A:
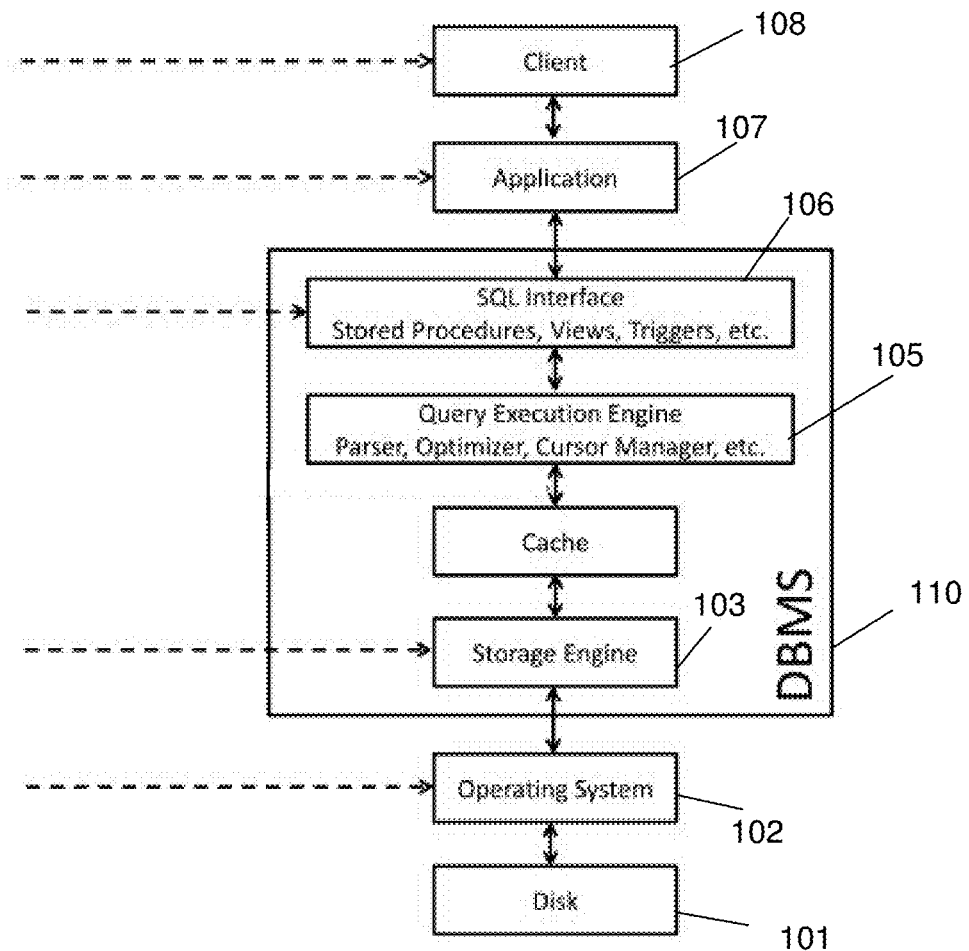
FIG. 1a schematically describes the possible layers of encryption according to prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS OF THE INVENTION

The present invention relates to structure preserving database encryption method and system, wherein, the architecture is based on placing the encryption module inside the database management software (DBMS), just above the database cache and using a dedicated technique to encrypt each database value together with its coordinates.

These two properties allow the architecture of the present invention to achieve a high level of data security while maintaining high performance and total transparency to the application layer.

Figure 1B:
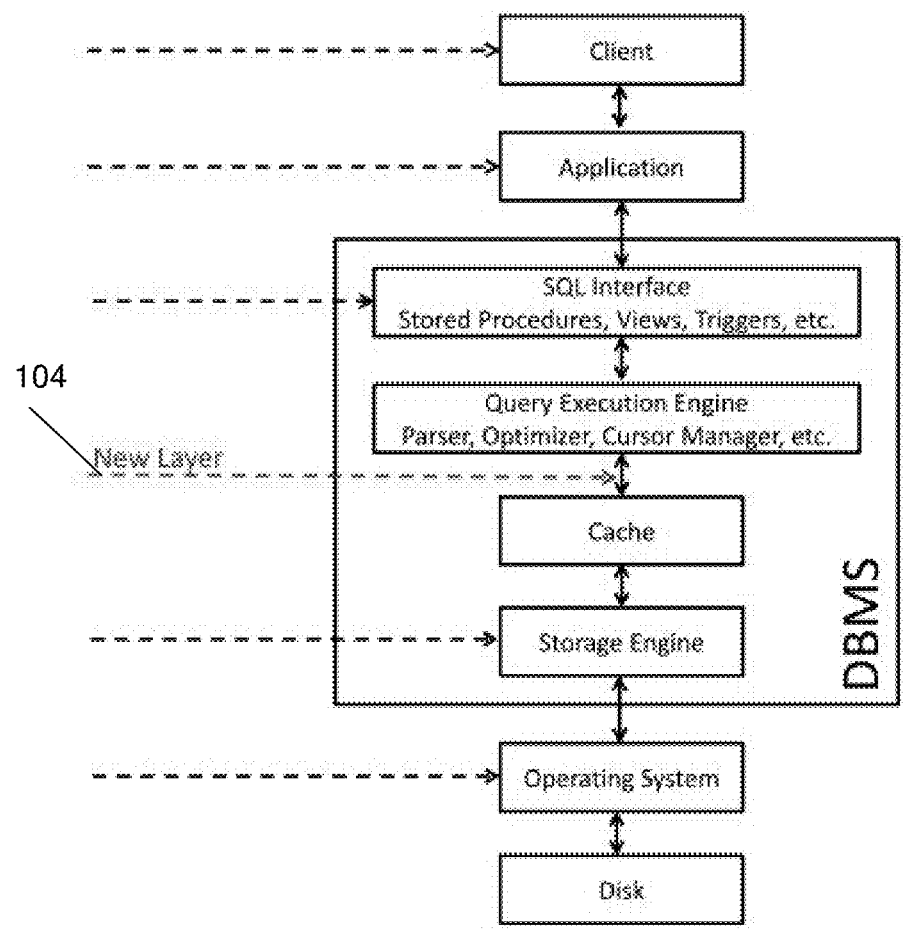
FIG. 1b schematically describes the possible layers of encryption according to the present invention.

As can be seen in FIG. 1b the above cache layer 104 is located in the database management software (DBMS) 110.

Placing the encryption module above the cache and using encryption at the cell granularity level greatly improves performance since it allows to encrypt/decrypt only relevant portions of the pages when a query is executed. The operating system and storage engine architectures, as opposed to the architecture of the present invention, lack this flexibility. However, simple encryption at the cell granularity level, might be vulnerable to information leakage and unauthorized modifications, and therefore in the present invention a special encryption scheme was developed, in which each cell value is encrypted together with its cell coordinates. Finally, encryption in the present invention architecture is totally transparent to all layers above it (including the query execution engine 105 and the application layer 107), since it takes place just above the cache (see FIG. 1b). Just like the operating system 102, storage engine 103 and SQL interface 106 architectures, the architecture of the present invention assumes the database server to be partially trustworthy.

In the "above cache" layer 104, data is encrypted/decrypted upon access to the cache. In this model, the pages in the DBMS cache are identical copies of pages on the disk. Since encryption in the "above cache" layer 104 of the present invention is performed at the cell granularity level, accessing a single value in the encrypted cache requires only its decryption, without the need to decrypt other values. Furthermore, encryption in this layer provides cryptographic access control at the cell granularity level since different values in the cache can be encrypted using different keys, and decrypting one value does not require the decryption of other values (as opposed to encryption in the operating system 102 or storage engine layers 103).

Moreover, since encryption in the present invention takes place just above the cache, all layers above it (including the query execution engine 105 and the application layer 107) continue to function as usual.

The position of a cell in the database is unique and can be identified using the triplet that includes its table, row and column IDs, (hereinafter "cell coordinates"). In the scheme of the present invention, the cell coordinates are joined to the plaintext value before being encrypted. These coordinates are used to: (1) break the correlation between ciphertext and plaintext values (equal plaintext values are encrypted to different ciphertext values depending on their location) thus preventing static leakage attacks and (2) bind an encrypted value to its location in the database thus preventing splicing attacks.

Figure 2:
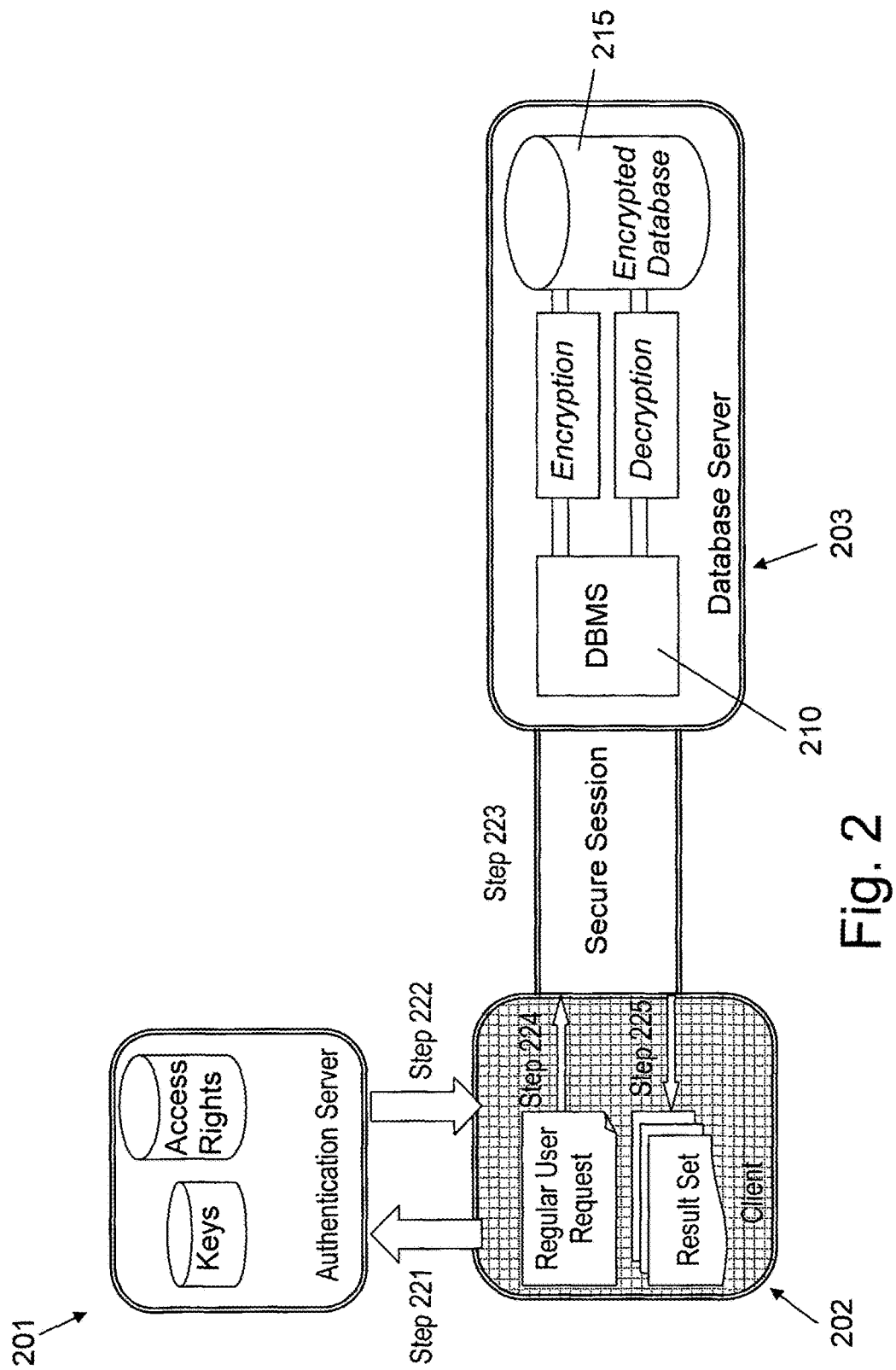
FIG. 2 is a schematic illustration of the system architecture of the method of the present invention, according to an embodiment of the present invention.

FIG. 2 is a schematic illustration of the system architecture of the scheme of the invention, according to an embodiment of the present invention. Client 202 generates SQL commands (queries) and receives results to said queries from database server 203. Client 202 is responsible for generating a session and transferring encryption keys to Database Server 203. The encryption keys are used during the generated session by means of Database server 203 for encryption and decryption operations needed for performing queries of Client 202. Database server 203 is used for performing SQL commands by means of Database Management System (DBMS) 210, said commands received from Client 202 by use of encryption keys also received from said Client 202. Encryption database 215 comprises the encrypted data. Authentication Server 201 comprises the encryption keys of Client 202. Client 202 wishing to perform queries from Database server 203 has to be identified by Authentication Server 201 in order to receive the encryption keys. After Client 202 was identified by Authentication Server 201, the encryption keys are transferred from said Authentication Server 201 to Client 202. Then Client 202 transfers the encryption keys to Database Server 203.

It should be noted, that Client 202 according to all preferred embodiment of the present invention, refers to a computer and/or to a person.

At step 221, Client 202 identifies itself to Authentication Server 201 by means of a conventional identification protocol, such as Kerberos. After Client 202 was identified by Authentication Server 201, at step 222 Client 202 receives the encryption keys, which are relevant for performing said Client 202 queries, according to said Client 202 access right definition. Each client can have different encryption keys according to his access right definition for accessing various data tables stored in Database Server 203. Client 202 wishing to access data to which he does not have a corresponding encryption key, is not able to decrypt said data, since he does not have an encryption key by use of which said data was encrypted. Then at step 223, Client 202 generates a session with Database Server 203 and transfers to said Database Server 203 the corresponding encryption keys, which are used by Database Server 203 for performing queries received from Client 202. At step 224, Client 202 generates a query (an SQL at least one command is sent to Database Server 203). At step 225, Database Server 203 searches Encrypted Database 215 for the corresponding data requested in the above query, and after such data is found, said data is decrypted by means of the corresponding encryption keys. The results of the above query are transferred from Database Server 203 to said Client 202 in non-encrypted form, and therefore Client 202 does not need to perform any decryption operation on said results.

The system architecture of FIG. 2 ensures that, after a secure session is created, the whole process of encryption and decryption performed by Database Server 203 is transparent to Client 202.

The system and method, according to a embodiment of the present invention, assumes that the database server is trusted. That is, all encryption and decryption operations will be performed on the server. In order to perform these operations, all the necessary encryption keys should be accessible to the server during the valid session a logged-on user. These keys should be retained only in the server's memory during the session. The encryption method introduces a new line of defense for "data at rest": a DBA managing the database has no access to any of the encryption keys, and learns nothing about the database values. Furthermore, an intruder managing to break into the database and read the stored data cannot learn anything about the database values. Moreover, when the data is backed up, only the encrypted form of the data is stored on the backup site, thus the data is secured against data disclosure.

FIG. 3 illustrates a database encryption method, according to the prior art. A table 300 has, for example, one data column "C" numbered 302 and ten Rows (a column showing the identifiers of rows is numbered 301). A table 310, which is the encryption of table 300, also has, for example, one data column "CC" numbered 312 and ten Rows (a column showing the identifiers of rows is numbered 311). The equal plaintext values in table 300 are encrypted to the corresponding equal ciphertext values in table 310. For example, cells 303, 304 and 305 in table 300 have equal values of "16". As a result, in table 310 the corresponding cells 313, 314 and 315 also have equal ciphertext values "#$". Therefore, this prior art method is sensitive to substitution attacks, attempting to switch encrypted values and to patterns matching attacks, attempting to gather statistics based on the database encrypted values.

Figure 4:
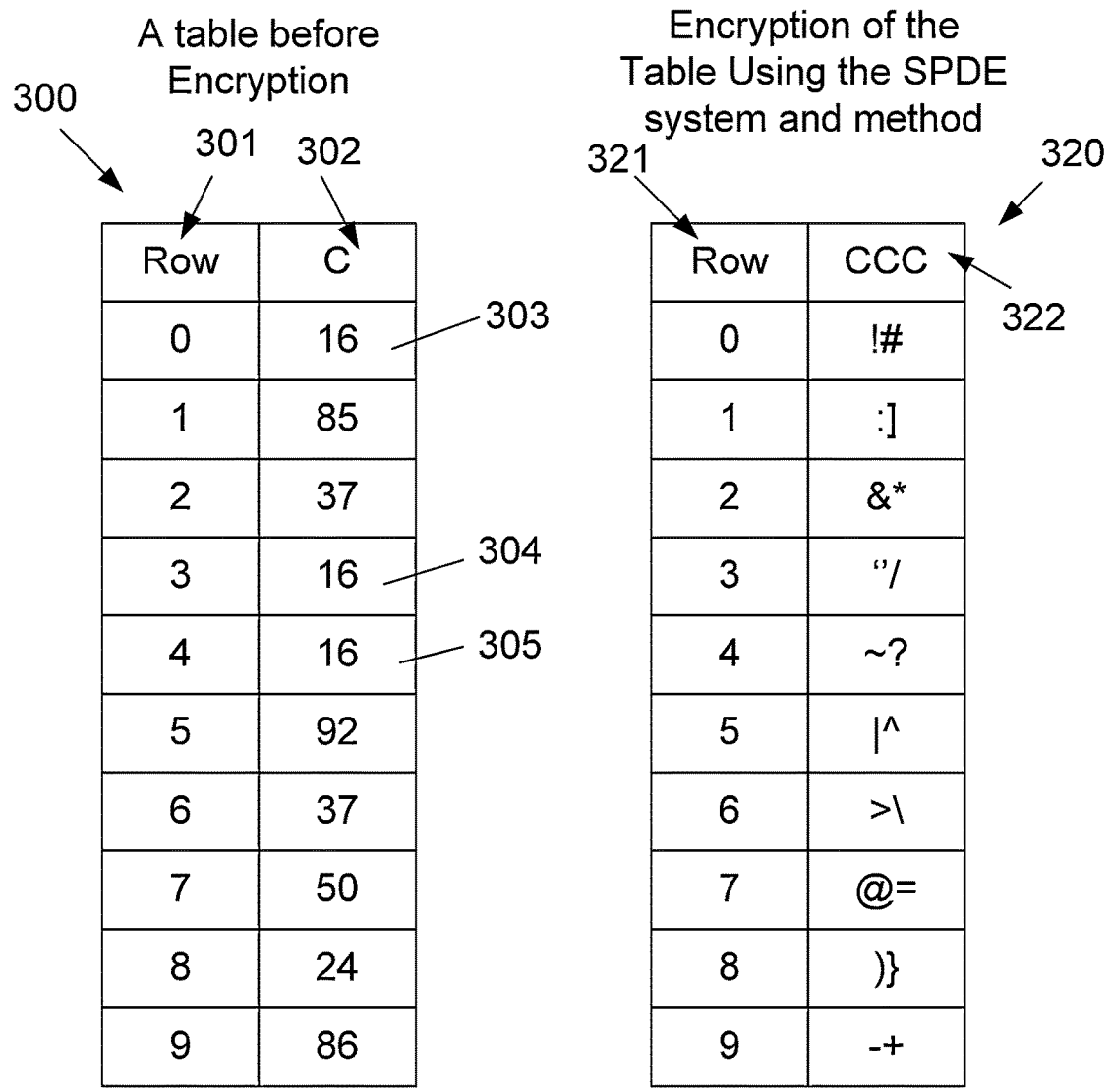
FIG. 4 discloses a database encryption employing a Structure method of the present invention, wherein the structure of the database tables and indexes remain as before encryption, according to an embodiment of the present invention.

FIG. 4 discloses a database encryption employing the scheme method of the present invention, wherein the structure of the database tables and indexes remain as before encryption, according to an embodiment of the present invention. A table 300 has, for example, one data column "C" numbered 302 and ten Rows (a column showing the identifiers of rows is numbered 301). A table 320, which is the encryption of table 300, also has, for example, one data column "CCC" numbered 322 and ten Rows (a column showing the identifiers of rows is numbered 321). Each database cell value in table 320 is encrypted with its cell coordinates and therefore, the equal plaintext values in table 300, for example the values "16" in cells 303, 304 and 305 are encrypted to the corresponding different ciphertext values in table 320.

Therefore, the dedicated encryption method of the present invention, according to an embodiment of the present invention, has two immediate advantages. First, it eliminates substitution attacks attempting to switch encrypted values. Second, patterns matching attacks attempting to gather statistics based on the database encrypted values would fail.

The system and method of the present invention ensure that database tables and indexes can be managed as usual by a DBA in their encrypted form, while keeping the data secure. Furthermore, since the database structure remains the same, queries are not changed because of the encryption. This ensures that existing applications can use the encrypted database without the need for any changes in the application software. The basic assumption behind the method of the present invention is the existence of an internal cell identifier which is beyond the reach for an adversary and thus, is tamper proof. Most of the commercial DBMS such as Oracle® and MS-SQL® generate row-ids for each record. Row-id is a pointer to a database row defining the physical location of that row in the database. Thus, if changed, the row-id will no longer identify the same row. The existence of row-ids ensures that the method of the present invention is applicable in commercial databases. The position of a cell in the database is unique and can be identified using the triplet that includes its Table ID (identification), Row ID, and Column ID. This triplet hereinafter is referred as the cell coordinates.

A formal explanation of how a value is being encrypted and decrypted in the scheme of the present invention is presented.

Let $V_{trc}$ be defined as a plaintext value located in table t, row r and column c.

μ: (N×N×N)→N is a function generating a unique number based on the cell coordinates. k is the encryption key.

$E_k$ is a symmetric encryption function (e.g., DES, AES) and ⊕ is a XOR logical operator. $E_{nc\ k}$ is a function which encrypts a plaintext value with its coordinates and is defined as follows at equation 1:

$$E_{nc\ k}(V_{trc}) = E_k(\mu(t,r,c) \oplus V_{trc}) \quad (1)$$

FIGS. 6a-6b illustrate table encryption in the scheme of the present invention. FIG. 6a illustrates a table, "T", which has one data column "C", and five rows (the identifiers of the rows are shown in column "Row ID"). FIG. 6b illustrates the encryption of table "T".

If $X_{trc}=E_{nc\ k}(V_{trc})$ and $D_k$ are defined as the symmetric decryption function that suits E k, $D_{ec\ k}$ is a function which decrypts a ciphertext value ($X_{trc}$) and discards its coordinates and is defined as follows at equation 2:

$$D_{ec\ k}(X_{trc}) = \mu(t,r,c) \oplus D_k(X_{trc}) = V_{trc} \quad (2)$$

Since each value is encrypted with its own unique cell coordinates, trying to decrypt a value with different cell coordinates (e.g., as a result of a substitution attack) would most probably result in an invalid plaintext value. However, if the range of valid plaintext values is not significantly smaller than the whole possible range, or invalid plaintext values cannot be distinguished from valid plaintext values, encryption must be carried out as follows (|| stands for concatenation) as shown at equation 3:

$$E_{nc\ k}(V_{trc}) = E_k(\mu(t,r,c) \| V_{trc}) \quad (3)$$

Since μ(t, r, c) is concatenated to the plaintext value before encryption, attempting to change the ciphertext value, or trying to switch two ciphertext values, would result in a corrupted μ(t, r, c) after decryption. Obviously, concatenating μ(t, r, c) results in data expansion, and the size of μ introduces a tradeoff between security and data expansion.

The encryption method of the present invention assumes the existence of an internal cell identifier that can be queried but not tampered. These identifiers are encrypted together with the cell value. Most commercial DBMSs (e.g., Oracle, DB2, SQL Server), implement indexes and tables as heap files. In such implementations, index and table entries are uniquely identified using the file id, page id and slot id triple, usually referred to as "rowids". Rowids are used as references from indexes. Data Manipulation Language (DML) operations such as insert, update and delete do not modify the references of existing rowids. Otherwise, each DML operation would require re-indexing the table. This property of rowids serves the scheme of the present invention when it pertains to performance issues since re-encryption is required only when the encrypted value is changed. Even more complicated operations, such as backup and recovery can be performed without requiring re-encryption. However, some other operations such as reorganization of the database, import/export or revocation of keys require the decryption and re-encryption of large amounts of data. Fortunately, those operations are relatively rare.

An ideal secure implementation of μ would generate different numbers for different cell coordinates. Such an implementation, would not allow the adversary to replace the encrypted contents of any two cells, without being noticed. However, generating a unique number for each cell coordinates would produce large numbers, and would therefore induce a considerable storage overhead. An alternative practical implementation would be to generate a unique number first, and then apply a cryptographic hash function to reduce its size. Using a cryptographic hash function would make the task of finding two cells which have the same μ value extremely hard for the adversary.

However, even if μ is implemented using a cryptographic hash function, the database size would still be expanded. Consider, for example, a 10 GB database that has 2 GB of sensitive data (i.e., 20%). Further, assume that 1 GB of this sensitive data is composed of 32 character strings, 0.5 GB is composed of integer values (each requires 4 bytes), and the rest 0.5 GB is composed of doubles (each requires 8 bytes). Finally, assume that Advance Encryption Standard (AES) with 128 bits keys is used as the underlying encryption function, and that μ is implemented as SHA-1(t||r||r||c), wherein SHA is a well-known cryptographic hash function. (Another option for saving space is to encrypt short string or numeric data with the use of "light-weight block cipher", as known in the art.).

If cell coordinates are utilized as in Equation 1, each sensitive value would first be padded so that its length becomes a multiple of 16 bytes length, then it would be XORed with its corresponding 16 bytes μ value, and would finally be encrypted, resulting in 32 bytes for each sensitive string value and 16 bytes for each sensitive integer or double value. This indicates that the sensitive portions of the string would produce no overhead, the sensitive portion of the integers would produce a 1.5 GB overhead, and the sensitive part of the doubles would produce a 512 MB overhead. Consequently, the whole database size would be expanded from 10 GB to 11 GB.

Alternatively, if cell coordinates are utilized as in Equation 3, the 16 bytes μ, value would first be concatenated to the corresponding sensitive value, then it would be padded so that its length becomes a multiple of 16 bytes, and finally it would be encrypted, resulting in 48 bytes for each sensitive string value and 32 bytes for each sensitive integer or double value. Meaning that the sensitive portions of the string would produce a 1 GB overhead, the sensitive portions of the integer would produce a 3.5 GB overhead, and the sensitive part of the double would produce a 1.5 GB overhead. Consequently, the whole database size would be expanded from 10 GB to 16 GB.

It is important to note that such storage overheads are not specific to the above cache architecture of the present invention, and are common to all cell-level encryption architectures. For example, using Oracle TDE, without SALT values, in the above example, would result in an 11 GB database. However, it would be vulnerable to information leakage and unauthorized modification attacks. Adding SALT values (16 bits each) in order to prevent information leakage, would result in a 16 GB database. Furthermore, as opposed to cell coordinates, SALT values are ineffective against unauthorized modifications attacks. Since page-level encryption granularity does not induce any storage overhead, and since cell-level encryption granularity provides numerous advantages over the page-level encryption granularity (as explained earlier), prior art suggest a compromise between the two encryption granularities. This prior art method uses the CTR mode for performing encryption at the page-level (and thus having no storage overhead), while allowing decrypting each value separately (and therefore enjoying the advantages of cell-level encryption granularity). However, this method of the prior art still suffers from several page-level granularity disadvantages: (1) it requires encrypting the whole table, i.e., non-sensitive data also has to be encrypted; (2) it uses the same key for the whole table and therefore, it does not allow cryptographic access control at a finer granularity level than a table; and (3) it requires re-encrypting the whole page with each modification of data within that page, even if only a single value was modified. To summarize, while the cell-level encryption granularity provides numerous advantages over the page-level encryption granularity, it comes with the price of storage overhead. Fortunately, storage is becoming cheaper and cheaper every day.

Similarly to the operating system architecture, since encryption in the architecture of the present invention is located just above the database cache, indexes can be constructed on encrypted columns in the exact same way that they were constructed on non-encrypted columns before. More specifically, when an index is being constructed on an encrypted column, the construction process has to retrieve the encrypted values of this column. Such retrievals involve accessing the database cache, which like every other access to values in the database cache, leads to their decryption. Namely, even though the column is encrypted, the index is constructed on the plaintext form of this column, resulting in a full-functioning index.

However, how secure is that index? To answer this question, it is first important to note that in many cases, indexes and tables are stored and treated in the same way by the DBMS (e.g., MySQL, in which the present invention architecture was implemented with). Therefore, it is possible to encrypt "index tables" in the exact same manner that "regular tables" are encrypted, "for free" (i.e., without any additional implementation). Since index tables would be encrypted exactly the same as regular tables, their values would also be encrypted using their cell coordinates, and therefore, would be less vulnerable to static leakage, spoofing and splicing attacks. As a final note, it is important to make sure that all values in the index table are encrypted. Otherwise, it can be vulnerable. More specifically, the values which are stored in an index table, can be categorized into three types: indexed values (copies of the values from the indexed column); internal pointers (pointers between index entries, such as between nodes in a B-Tree implementation); and external pointers (pointers to the corresponding records in the indexed table). Choosing to encrypt only the indexed values, for example, would reveal their order (i.e., linkage information leakage).

The transaction log constitutes one of the most important mechanisms in DBMSs. The transaction log keeps a history of actions executed by the DBMS to guarantee ACID properties over crashes or hardware failures. If the DBMS finds the database to be in an inconsistent state, it reviews the log for uncommitted transactions and rolls back the changes made by these transactions. Since the transaction log contains detailed information about transactions, protecting its contents from unauthorized access is highly important.

The transaction log is usually implemented as a file, stored in stable storage, which contains a sequence of records. Each log record is made up of: (1) record id, (2) previous record id, (3) transaction id, (4) type and (5) extra information. The update log record, notes a change to a database page, and includes the extra information of (1) file id, (2) page id and (3) the bytes of the page before and after the update. The fact that the database pages in the architecture of the present invention (i.e. the above cache) are always kept encrypted (even in the database cache), fits perfectly into the transaction log mechanism. First, it means that copies of database pages that are stored in the transaction logs (as part of Update log records), would also be kept encrypted, and thus they would not expose sensitive information. Second, the DBMS may perform a recovery operation, without involving the users (and requesting their encryption keys), since no encryption or decryption operation is needed when copying an old page instead of a new one.

As mentioned above, a rowid is composed of the triple: file id, page id and slot id. This internal structure of rowids allows the architecture of the present invention to perform database backup operations at the database file granularity level, without the need to encrypt or decrypt data.

FIG. 7 schematically shows a pseudo-code of the implementation of the present invention according to an embodiment of the invention. The present invention architecture (i.e. above cache) was implemented in MySQL as it requires changing only two strategic points in the InnoDB storage engine: the place where a value is read from the cache (add decryption) and the place where a value is written to the cache (add encryption).

Performance Evaluation

In order to check the performance of the present invention, the architecture of the present invention was compared with others known architectures described above. The operating system, storage engine and the present invention above cache architectures were implemented by modifying the source code of MySQL (version 5.520). All of the experiments also included the SQL interface architecture. For the encryption, the AES 4 implementation was used, which was included in MySQL source code, with 128 bits keys and the cipher-block chaining (CBC) mode. Key initialization was performed once for each encryption/decryption operation (i.e., either once for a cell or once for a page, depending on the architecture). Encryption of values in the above cache architecture utilized their cell-coordinates as in Equation 1, where the µ function was implemented as SHA-1(t||r||c). For both of the above cache and the storage engine architectures, sensitive values were padded before encryption so that their size would become a multiple of 128 bits. The operating system architecture did not require any padding since the size of pages was already a multiple of 128 bits. FIG. 5 summarizes the implementation details for the different architectures.

All experiments were conducted on an Intel Core i7 CPU 2.67 GHz personal computer with 4 GB of RAM, running Ubuntu 12.04 LTS. In order to keep the analysis as simple as possible, the following three assumptions are made: (1) the size of a ciphertext database value equals its size before encryption; (2) all database values have the same size and (3) all database values are encrypted. Given a query Q, its overall execution time is denoted when using the without encryption architecture as $T^Q_{we}$; the number of database values that were accessed during the execution of Q as N; the number of database values that required disk access as $N_{disk}$; the number of values that were accessed directly from the database cache as $N_{cache}=N-N_{disk}$; the time it takes to decrypt a single database value as $T_{value}$ and the time it takes to decrypt a whole database page as $T_{page}$.

The overhead of the operating system architecture compared to the without encryption architecture is in the decryption of each database page that is loaded from disk into cache. Therefore the execution time of Q using the operating system architecture can be written as:

$$T^Q_{os}=T^Q_{we}+N_{disk}\cdot T_{page}=T^Q_{we}+(N-N_{cache})\cdot T_{page}$$

Similarly, since the overhead of the present invention architecture compared to the without encryption architecture is in the decryption of each database value that is accessed during the query, the execution time of Q using the present invention architecture can be written as:

$$T^Q_{ac}=T^Q_{we}+N\cdot T_{value}$$

Then, the difference between execution times is:

$$T^{Qos} - T^{Qac} = (T_{we} + (N - N_{cache}) \cdot T_{page}) - (T_{we} + N \cdot T_{value})$$
$$= N \cdot T_{page} - N_{cache} \cdot T_{page} - N \cdot T_{value} > 0$$

Written differently, it can be seen that:

$$N \cdot (T_{page} - T_{value}) > N_{cache} \cdot T_{page}$$

$$N_{cache}/N < (T_{page} - T_{value})/T_{page}$$

$$N_{cache}/N < 1 - T_{value}/T_{page}$$

Meaning that for a values hit-ratio, $N_{cache}/N$, lower than $1 - T_{value}/T_{page}$, the present invention architecture would outperform the operating system architecture. In order to quantify the ratio $T_{value}/T_{page}$ in our system, the time taken to decrypt $10^9$ single database values was measured (assuming their size to be 16 B) compared to the time taken to decrypt $10^9$ whole pages (16 KB in our MySQL configuration), and found the ratio between these two quantities to be roughly 1/315. (As explained earlier although 16 B/16 Kb=1/1024, decrypting one large chunk of data is faster than decrypting it in parts.) Stated differently, as long as the values hit ratio, $N_{cache}/N$, is lower than 1 −1/315=0.9968, the present invention architecture should outperform the operating system approach. Since under these assumptions, all database values require encryption, the storage engine architecture would necessarily be outperformed by the operating system architecture and thus its detailed analysis was omitted.

For the experiments, three publicly available benchmarks were used: TPC-H, TPC-C and InnoDB.

The TPC-H benchmark simulates systems that examine large volumes of data and execute complex queries. It consists of a data population tool and a suite of 22 queries. The database schema includes eight tables with a total of 60 attributes and 16 indexes. For all TPC-H experiments, the data population tool was used, configured with default settings, to generate a 1780 MB database. Each of those experiments included the execution of the 22 queries over the three implementations. Each experiment was repeated 11 times. The first execution was ignored and the results of the other 10 executions were averaged. (The first execution was used to make sure that data is loaded into the database cache).

Figure 8:
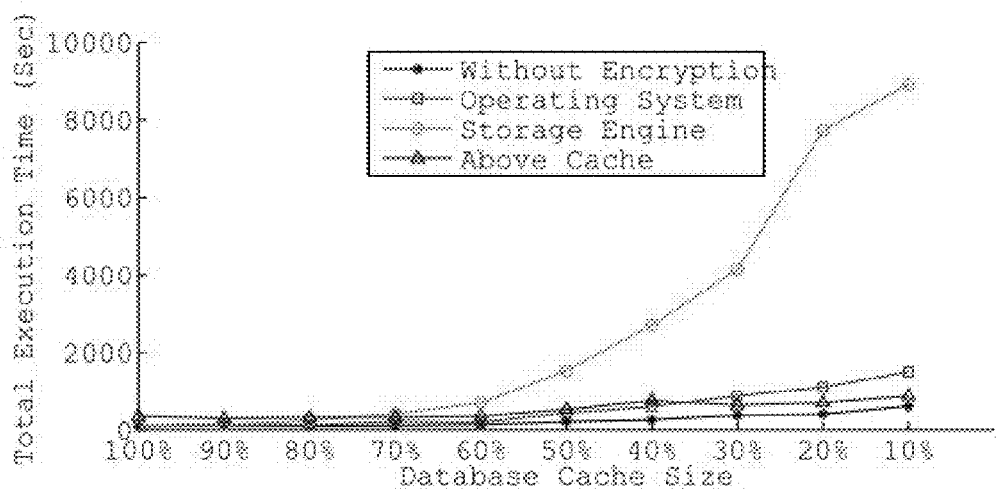
FIG. 8 schematically shows the total execution time for each one of the architectures and for the MySQL no-encryption original implementation, as a function of the database cache size, with the TPC-C benchmark.

In the first experiment, the influence of the database cache size on the performance of the different architectures was tested. It was assumed a 100% encryption (i.e. all database values were considered sensitive and required encryption), and examined cache sizes that correspond to 10%, 20%, . . . , 100% of the database size. FIG. 8 shows the total execution time for each one of the architectures and for the MySQL no-encryption original implementation, as a function of the database cache size.

As expected, for a 100% cache size, the operating system and the storage engine architectures have roughly zero overhead since all pages were present in their plaintext form in the database cache (zero pages were loaded from disk and thus zero decryption operations were performed). In such a scenario, where the database cache is large enough to contain the whole database content, and the whole database is encrypted, the present invention implementation degradation factor is roughly 4. However, in most realistic scenarios, cache sizes are not likely to be large enough to contain the whole database content. As can be seen in the FIG. 8, the present invention architecture outperforms the storage engine architecture for database cache sizes that are lower than 70% and the operating system architecture for database cache sizes that are lower than 40%. (Also note that the performance of the "without encryption" solution degrades when decreasing the cache size. This is due to the increased number of IO operations).

Figure 9:
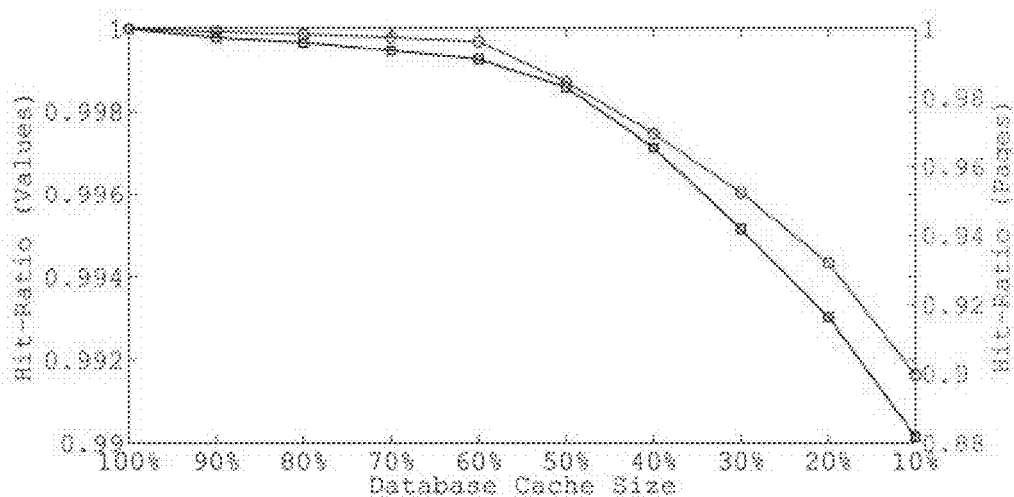
FIG. 9 schematically shows the values hit-ratio and the pages hit-ratio as a function of the database cache size, with the TPC-C benchmark.

In order to cross-validate the empirical results with the analytical results presented above, the hit-ratio values were measured as a function of the database cache size. FIG. 9 shows the values hit-ratio, in the present invention architecture, as a function of the database cache size, when using 100% encryption. As expected, the values hit-ratio decreases exponentially when decreasing the cache size, and becomes lower than 0.9968 for a database cache size of 40%. This perfectly fits the phase transition, which was shown in FIG. 8. In many cases, database administrators use the pages hit-ratio as a guide-line when tuning the database cache size. Since the analytical results are based on the values hit-ratio and not on the pages hit-ratio, the two hit-ratios were measured for the present invention architecture, as a function of the database cache size, when using 100% encryption. As illustrated in FIG. 9, a database cache size lower than 40% entails a values hit-ratio lower than 0.9968 and a pages hit-ratio of roughly 0.97. Stated differently, for pages hit-ratios lower than 0.97, the present invention architecture would outperform the operating system architecture. This result is especially interesting since many real world databases are configured to have a pages hit-ratio of roughly 0.9.

In terms of storage overhead, using 100% encryption, the storage engine and the present invention architectures expanded the database size from 1780 MB to 2850 MB (i.e., roughly 60%). The operating system architecture, as explained earlier, had no storage overhead. In the experiments, 100% encryption was used. However, in some realistic scenarios, not all database values must be considered sensitive. Reducing the encryption percentage would make the present invention architecture superior to the operating system architecture even for higher database cache sizes, as demonstrated in the following section.

Figure 10:
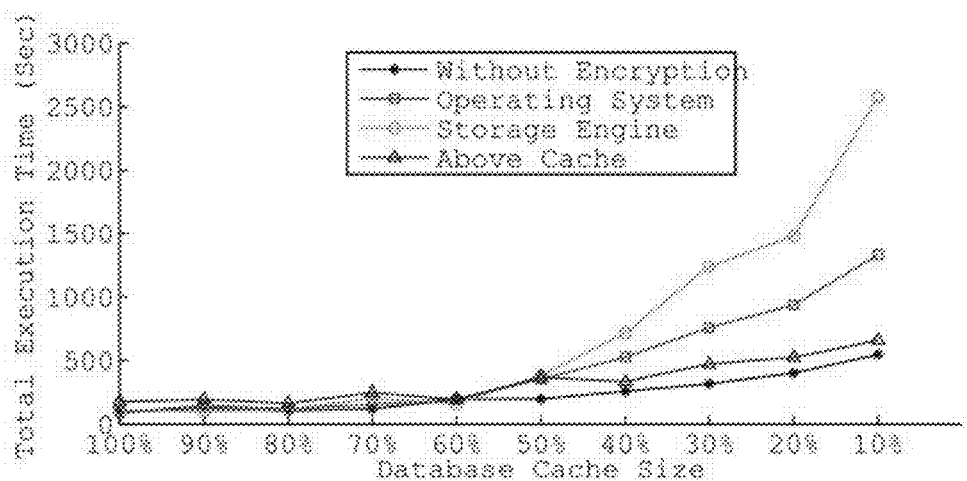
FIG. 10 schematically shows the total execution time for each one of the architectures, as a function of the database cache size, when using 20% encryption, with the TPC-C benchmark.

In order to simulate X % encryption in the present invention and storage engine architectures (the operating system architecture always implies 100% encryption), all database values that their corresponding μ values, had a remaining lower than X, when divided by 100 are selectively encrypted. Note that in the present invention architecture, using encryption percentages lower than 100%, implies that the database cache would contain both ciphertext and plaintext values (in the operating system and storage engine architectures, the database cache would contain only plaintext values, regardless of the encryption percentage being used). FIG. 10 shows the total execution time for each one of the architectures, as a function of the database cache size, when using 20% encryption. In this scenario, the present invention architecture already outperforms the storage engine and operating system architectures for database cache sizes lower than 50%.

Figure 11:
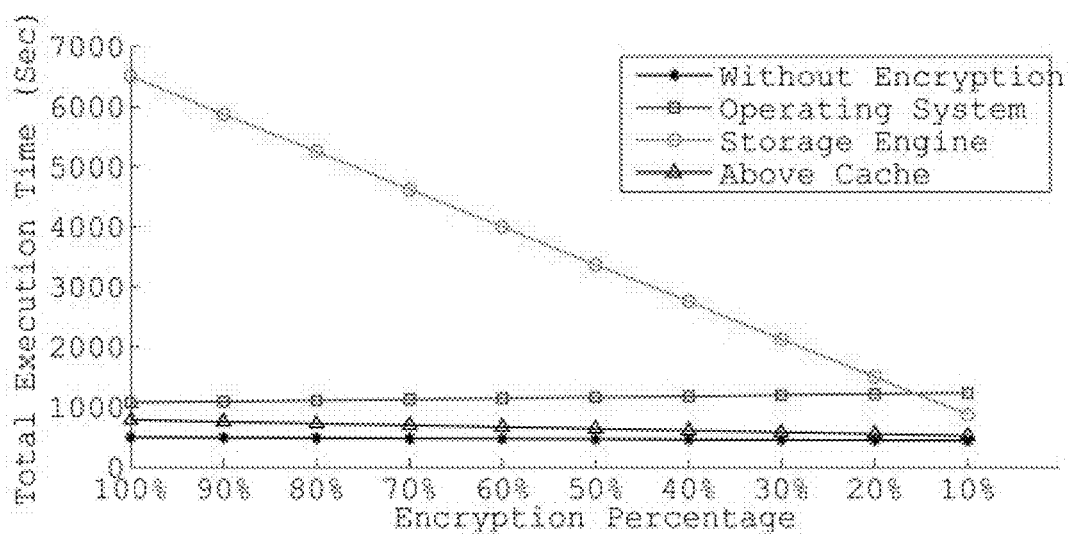
FIG. 11 schematically shows the total execution time for each one of the architectures, as a function of the encryption percentage, when using a fixed 20% database cache size, with the TPC-C benchmark.

In order to understand better the influence of the encryption percentage on performance, an additional experiment was conducted. FIG. 11 shows the total execution time for each one of the architectures, as a function of the encryption percentage, when using a fixed 20% database cache size (the reported results were fitted using linear regression). As expected, the storage engine and the present invention architectures decrease roughly linearly with smaller encryption percentages. The operating system performance remains roughly constant, since this architecture does not support selective encryption, and thus it implicitly entails 100% encryption.

Figure 12:
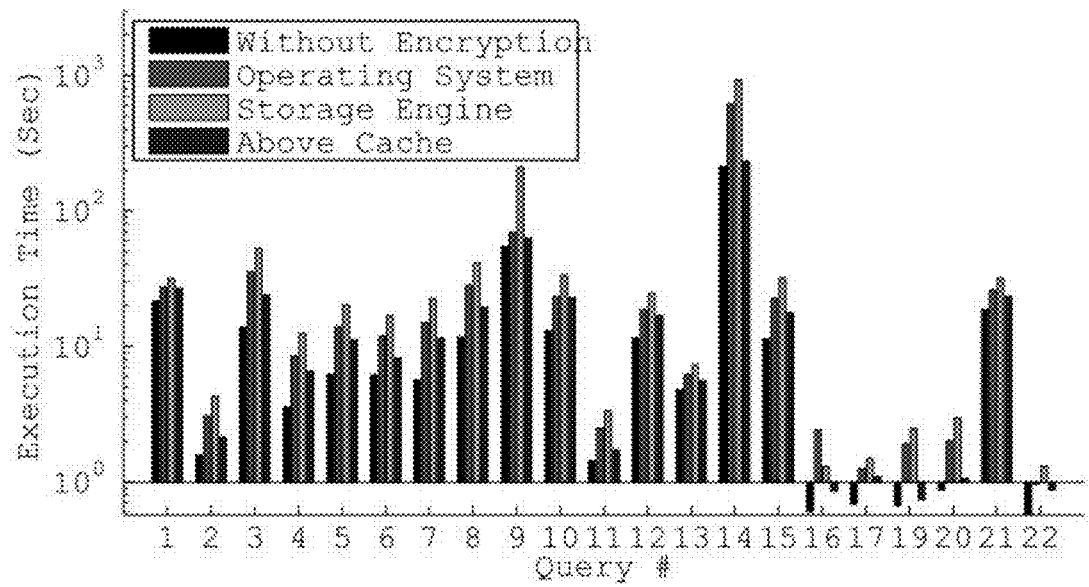
FIG. 12 schematically shows the results of an experiment where the execution time of each one of the architectures and each one of the 22 queries are presented, separately, when using 20% database cache size and 20% encryption, with the TPC-C benchmark.

In all the above experiments, the execution time of all 22 TPC-H queries was summed up. However, some queries may have a significantly lower execution time compared to other queries, and therefore may not influence the total execution time. Therefore, another experiment was made, where the execution time of each one of the architectures and each one of the 22 queries are presented, separately, when using 20% database cache size and 20% encryption. The results are shown in FIG. 12. As expected, the results of this experiment, which are shown at a query level, are consistent with those of previous experiments (pay attention to the log scale).

Figure 13:
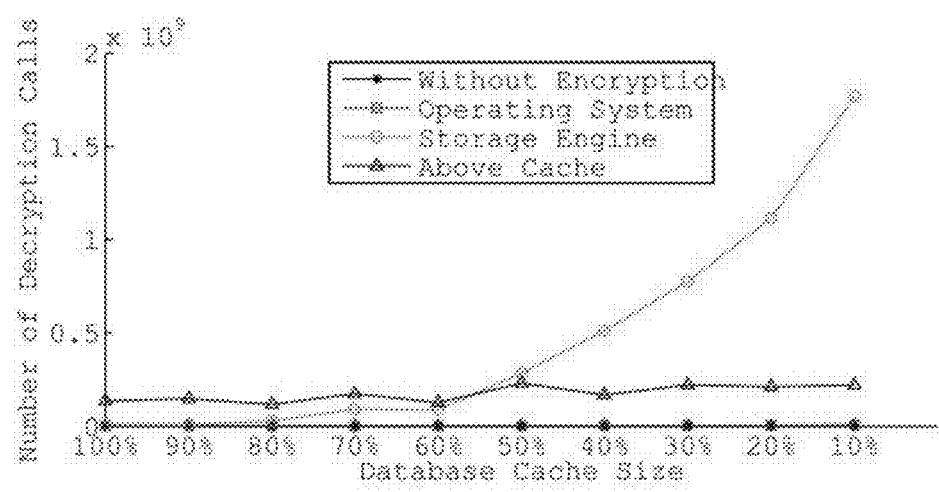
FIG. 13 schematically shows the total number of decryption operations for each one of the architectures, as a function of the database cache size, when using 20% encryption, with the TPC-C benchmark.
Figure 14:
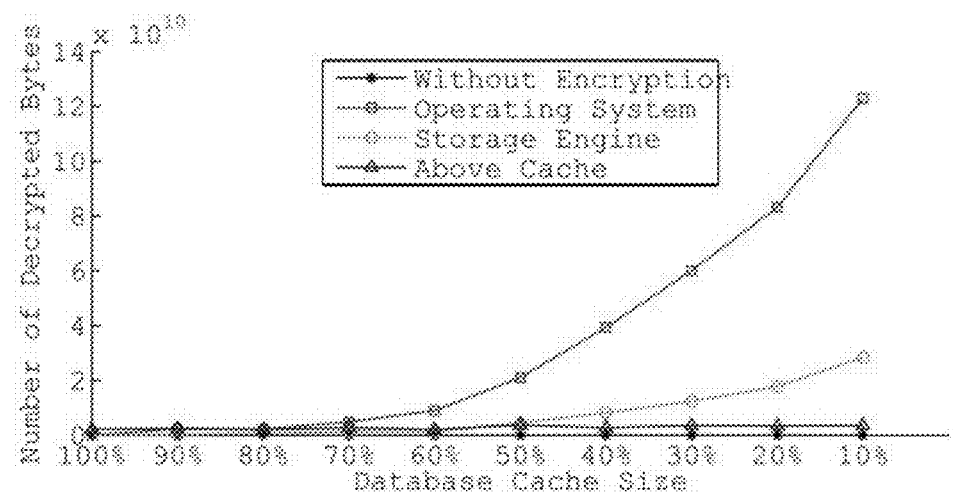
FIG. 14 schematically shows the total number of decrypted bytes for each one of the architectures, as a function of the database cache size, when using 20% encryption, with the TPC-C benchmark.

FIG. 13 shows the total number of decryption operations for each one of the architectures, as a function of the database cache size, when using 20% encryption. As shown in FIG. 13, the present invention architecture maintains a roughly fixed number of decryption calls, independently of the database cache size. Indeed, in this architecture, sensitive values are decrypted only when they are accessed, independently of the process which loads the pages into the database cache. In the storage engine architecture, however, the number of encryption calls grows exponentially when decreasing the database cache size. The reason for this is that reducing the cache size increases the number of cache misses, and therefore a greater amount of pages has to be loaded into the database cache, resulting in multiple decryption operations for each such page (an encryption operation for each encrypted value in that page). The same is true for the operating system architecture with the exception that a single decryption operation is performed for each loaded page. (Due to the small number of loaded pages compared to the large number of accessed values, that exponential growth for the operating system architecture cannot be inferred from looking at the FIG.). FIG. 14 shows the total number of decrypted bytes for each one of the architectures, as a function of the database cache size, when using 20% encryption. Note how here, the operating system architecture decrypts a much larger number of bytes compared to the storage engine architecture (roughly five times larger). The reason for this is that the operating system architecture has to decrypt the whole page when it is loaded into the cache, whereas the storage engine architecture has to decrypt only the sensitive values in that page. This property, however, doesn't help the storage engine architecture a lot in terms of performance (see FIG. 10), since in this case, decrypting one large chunk of data in a single operation is much faster than decrypting a smaller chunk in multiple operations. Similarly to the previous experiment, the present invention architecture maintains a roughly fixed number of decrypted bytes.

Experiments were also made with the TPC-C benchmark. While TPC-H is an on-line analytical processing (OLAP) benchmark, TPC-C is an on-line transaction processing (OLTP) benchmark. TPC-C portrays the principal activities (transactions) of a wholesale supplier. It consists of a data population tool and a suite of 34 queries. The database schema includes nine tables with a total of 92 attributes and 12 indexes. For all TPC-C experiments, the data population tool was used, configured with default settings, to generate a 1 GB database. The experiments included the execution of $2 \cdot 10^5$ transactions, where the first $10^5$ transactions were used to make sure that data was loaded into the database cache, and only the remaining $10^5$ transactions were actually measured.

Figure 15:
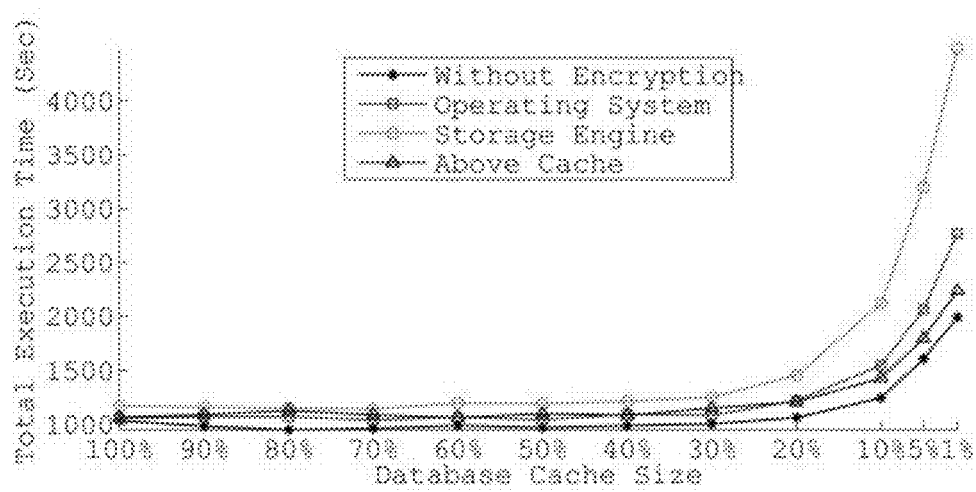
FIG. 15 schematically shows the total execution time for each one of the architectures, as a function of the database cache size, when using 100% encryption, with the TPC-C benchmark.

FIG. 15 shows the total execution time for each one of the architectures, as a function of the database cache size, when using 100% encryption. Again, it can be seen that the present invention architecture outperforms the operating system architecture for lower database cache sizes, starting from roughly 20%.

Figure 16:
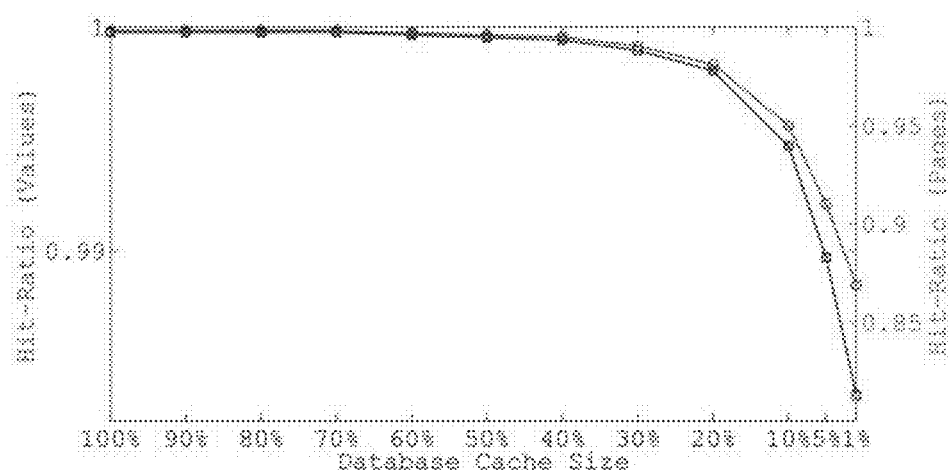
FIG. 16 schematically shows the values hit-ratio and the pages hit-ratio for the present invention architecture, as a function of the database cache size, when using 100% encryption, with the TPC-C benchmark.

FIG. 16 shows the values hit-ratio and the pages hit-ratio for the above cache architecture, as a function of the database cache size, when using 100% encryption. As illustrated in the Figs, a database cache size lower than 20% entails a values hit-ratio lower than 0.9968 and a pages hit-ratio of roughly 0.98. In other words, for pages hit-ratios lower than 0.98, the present invention architecture would outperform the operating system architecture. From the experiments above it can be seen that the architecture of the present invention performs better than the other architectures in both of the OLAP and OLTP cases under realistic scenarios.

Figure 17:
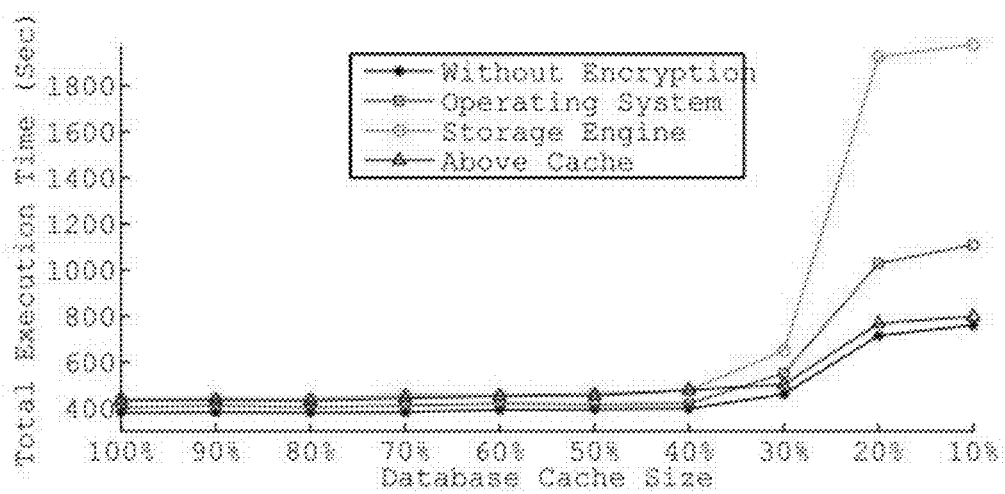
FIG. 17 schematically shows the total execution time for each one of the architectures, as a function of the database cache size, when using 20% encryption, with the InnoDB benchmark.

Finally, experiments were made also with the InnoDB benchmark. The schema of this benchmark contains two tables with three columns each and four indexes (one clustered and one non-clustered index for each table). The suite of queries includes nine different tests. The results for the InnoDB benchmark experiments were also consistent with those of the TPC-H and TPC-C benchmark experiments. FIG. 17, shows the total execution time for each one of the architectures, as a function of the database cache size, when using 20% encryption. Note that the InnoDB benchmark includes, in addition to SELECT queries, INSERT, UPDATE and DELETE queries (while the TPC-H benchmark is composed of SELECT queries only). This has the effect that when new data is inserted into the database, the entire data size becomes larger than the cache size even if it was set to 100% of the old data size, and as a direct consequence, the without encryption, operating system and storage engine architectures do not collide at 100% cache size. As shown in the experiments above, the database cache size has a major influence on performance. The question arises as to what is the influence of the operating system cache? Loading pages from the operating system cache to the database cache is much faster than loading them directly from disk. Therefore, reducing the operating system cache, would increase IO time, and would thus reduce the relative overhead of encryption (for all encryption architectures). It is important to note however, that since the IO part (not including encryption) is very similar for all architectures, loading pages to the database cache directly from disk, instead of loading them from the operating system cache, would be equivalent to adding a constant to the execution time of all architectures. In other words, decreasing the size of the operating system cache in the above experiments, is likely to change the total execution times, but is not likely to change the trends.

The invention claimed is:

1. A database residing on a database server comprising a memory with a database cache and at least one hardware processor, for encrypting sensitive information, the at least one hardware processor comprising:
 a) a Database Management Software (DBMS) module for performing encryption/decryption operations of data;
 b) a dedicated encryption module being inside said DBMS module in a layer belonging to a layered application architecture and being above said database cache, said dedicated encryption module is being transparent to the application layer and is adapted to encrypt each value of said database together with the coordinates of said value using a dedicated encryption method, which is implemented according to:

$$E_{nc\ k}(V_{trc}) = E_k(\mu(t,r,c) \oplus V_{trc});$$

wherein $V_{trc}$—is a plaintext value located in a table t, row r and column c;

$\mu: (N \times N \times N) \to N$ is a function generating a unique number, based on said cell coordinates;

k is an encryption key;

$E_k$ is a symmetric encryption function; and $E_{nc\ k}$ is a function which encrypts a plaintext value with said coordinates of said value.

2. The database according to claim 1, wherein $V_{trc}$ is decrypted by a decryption method, which is symmetric to said encryption method and is defined according to:

$$D_{ec\ k}(X_{trc}) \mu(t,r,c) \oplus D_k(X_{trc}) = V_{trc};$$

wherein $X_{trc} = E_{nc\ k}(V_{trc})$;

$D_k(X_{trc})$ is a symmetric decryption function that suits $E_k$; and $D_{ec\ k}$ is a function which decrypts a ciphertext value ($X_{trc}$).

3. The database according to claim 1, wherein whenever the range of valid plaintext values is not significantly smaller than the whole possible range, or invalid plaintext values cannot be distinguished from valid plaintext values, said encryption method is implemented according to:

$$E_{nc\ k}(V_{trc}) = E_k(\mu(t,r,c) \| V_{trc});$$

wherein $\|$ stands for concatenation.

4. The database according to claim 1, wherein the coordinates of a value are a table, row and column.

5. The database according to claim 1, wherein indexes of said database are constructed on encrypted columns in the exact same way that said indexes were constructed on non-encrypted columns.

6. The database according to claim 1, wherein database backup operations at the database file granularity level are performed without the need to encrypt or decrypt data.

* * * * *